United States Patent
Suzuki et al.

(10) Patent No.: US 7,090,288 B2
(45) Date of Patent: Aug. 15, 2006

(54) APPARATUS FOR CONTROLLING STIFFNESS OF A VEHICLE BODY

(75) Inventors: Shunji Suzuki, Saitama (JP); Yuta Urushiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 58 days.

(21) Appl. No.: 10/962,655

(22) Filed: Oct. 13, 2004

(65) Prior Publication Data

US 2005/0088011 A1    Apr. 28, 2005

(30) Foreign Application Priority Data

Oct. 23, 2003  (JP) .............................. 2003-362912

(51) Int. Cl.
*B60R 19/02* (2006.01)
(52) U.S. Cl. .................. 296/187.09; 293/118
(58) Field of Classification Search ........... 296/187.03, 296/189.09, 203.01–203.04, 204; 293/102, 293/118, 132, 136; 280/784; 267/136; 188/371, 188/376, 377
See application file for complete search history.

(56) References Cited

U.S. PATENT DOCUMENTS

| 3,842,930 | A | * | 10/1974 | Fiala | ........................... 280/735 |
| 3,893,726 | A | * | 7/1975 | Strohschein | .................. 293/133 |
| 5,460,421 | A | | 10/1995 | Culbertson | |
| 6,019,419 | A | * | 2/2000 | Browne et al. | .......... 296/187.1 |
| 6,113,178 | A | * | 9/2000 | Faigle | .................... 296/187.06 |
| 6,203,098 | B1 | * | 3/2001 | Motozawa et al. | ..... 296/187.09 |
| 6,286,895 | B1 | | 9/2001 | Urushiyama et al. | |
| 2005/0012317 | A1 | * | 1/2005 | Taya et al. | .................... 280/784 |
| 2005/0087972 | A1 | * | 4/2005 | Urushiyama et al. | ........ 280/784 |

FOREIGN PATENT DOCUMENTS

| DE | 196 03 957 A1 | 8/1997 |
| JP | 11-291951 | 10/1999 |

* cited by examiner

*Primary Examiner*—H Gutman
(74) *Attorney, Agent, or Firm*—Arent Fox PLLC

(57) ABSTRACT

An apparatus for controlling stiffness of a vehicle body includes a slide member, a base member, a deformable member and an actuator. The slide member is disposed parallel to a direction of impact force acting on a first end of the slide member. The base member, which is disposed at a second end of the slide member, has a slit into which the slide member moves. The deformable member is disposed at the first end of the slide member. Both ends of the deformable member are connected to the base member and a cross section of the deformable member is substantially U-shaped. The actuator executes one of permitting the slide member to move into the slit and inhibiting the slide member from moving into the slit at a collision.

4 Claims, 6 Drawing Sheets

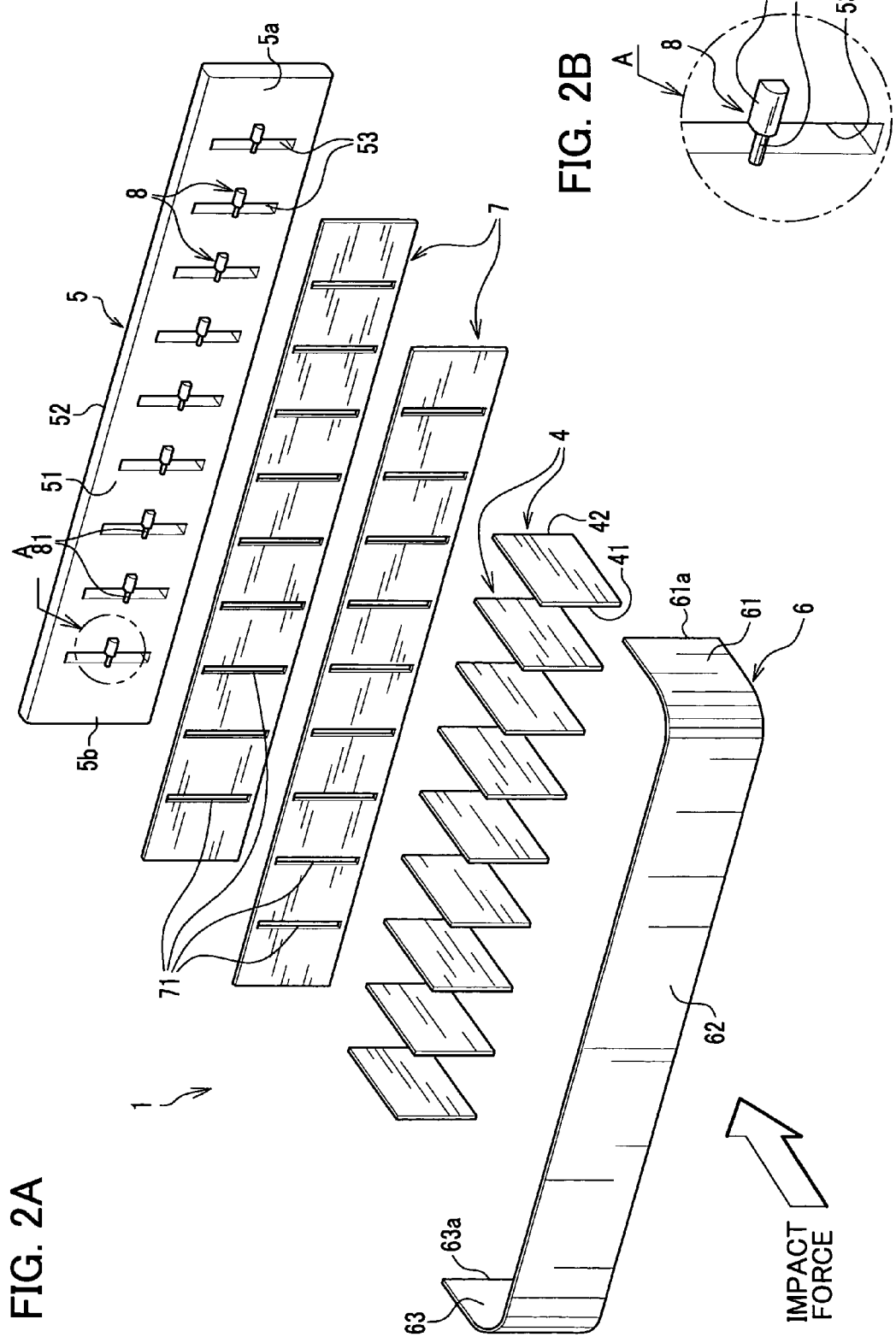

《SHAPE MEMORY ALLOY》

《MATERIAL DIFFERENT FROM A SHAPE MEMORY ALLOY》

APPARATUS FOR CONTROLLING STIFFNESS OF A VEHICLE BODY

BACKGROUND OF THE INVENTION

The present invention relates to an apparatus for controlling stiffness of a vehicle body, which is applied to a vehicle equipped with shock absorbing structure. The apparatus is able to control stiffness of a frame and the like of the vehicle body so as to provide appropriate reaction force according to collisions and colliding objects.

An apparatus for controlling stiffness of a vehicle body has been known, which has piezoelectric actuators for controlling stiffness of right and left side frames. An actuator, which is mounted to each side frame, selectively provides resistive force against impact force, which acts on the front of a vehicle in a backward direction, or assisting force for it according to collisions. Japanese Published Patent Application H11-291951 discloses related arts. The document discloses an apparatus which controls stiffness of side frames in the following manner. In case of a full wrap collision, in which the whole front of a vehicle is involved, the apparatus decreases the stiffness of side frames. On the other had, in case of an offset collision, in which impact force locally acts on one of the side frames, the apparatus increases their stiffness. In this way, the apparatus provides optimal shock absorption according to collisions.

The apparatus described above is able to vary stiffness of a vehicle according to sizes of colliding objects so as to control resistive force acting on a colliding object in addition to selection of stiffness according to collisions such as full wrap and offset collisions.

However, the apparatus described above requires a large amount of power to drive the piezoelectric actuator, which generates the resistive force against the impact force. This results in a drawback that the size of the piezoelectric actuator and the size of a battery for supplying power to it inevitably tend to increase.

SUMMARY OF THE INVENTION

The present invention seeks to provide an apparatus for controlling stiffness of a vehicle body, which is able to implement control with smaller force.

It is an aspect of the present invention to provide an apparatus for controlling stiffness of a vehicle body, including a slide member, a base member, a deformable member and an actuator. Description is given of each of these components. The slide member is disposed parallel to a direction of impact force acting on a first end of the slide member. The base member, which is disposed at a second end of the slide member, has a slit into which the slide member moves. The deformable member is disposed at the first end of the slide member. Both ends of the deformable member are connected to the base member, and a cross section of the deformable member is substantially U-shaped. The actuator executes one of permitting the slide member to move into the slit and inhibiting the slide member from moving into the slit at a collision.

When the apparatus described above allows the slide member to move into the slit cut in the base member, the stiffness of deformable member decreases because the slide member moves into the slit without deformation and only the deformable member buckles in a crushed fashion. On the other hand, when the apparatus positions the actuator so that it prevents the slide member from moving into the slit, the stiffness relatively increases compared with the former case because the slide member cannot move at a collision and buckles in a first deformation mode with an antinode, for example.

It is another aspect of the present invention to provide an apparatus, which further includes a restraint member that restrains deformation of a slide member in a direction substantially perpendicular to impact force.

When the apparatus described above allows the slide member to move into the slit cut in the base member, the stiffness of deformable member decreases because the slide member moves through the slit without deformation and only the deformable member buckles in a crushed fashion. On the other hand, when the apparatus controls the actuator so as to prevent the slide member from moving into the slit, movement of the slide member is restricted at a collision. Furthermore, the restraint member restricts deformation of the slide member in a direction substantially perpendicular to a direction of collision. When the restraint member holds only one position of the slide member, for example, a node is created at the held position and two antinodes are created in other parts of the slide member. Because the slide member buckles in this second deformation mode, the stiffness remarkably increases compared with the above case without deformation.

It is still another aspect of the present invention to provide an apparatus, in which both ends of a restraint member are connected to mutually facing portions of a deformable member and a restraint member has a slit through which a slide member moves.

The apparatus described above provides a wide range of stiffness for the deformable member in the same manner as that of the previous aspect of the present invention.

It is yet another aspect of the present invention to provide an apparatus, in which a slide member comprises a shape memory alloy.

The shape memory alloy described above has characteristics that its buckling load and distortion energy greatly vary according to its lengths compared with aluminum alloys and iron based material. It is specifically explained that when its length is not less than a predetermined value, its load takes a peak at buckling and subsequently decreases. In contrast to it, when its length is less than the predetermined value, its load again starts to increase in time after buckling. As described above, the shape memory alloy is a material which has two-stage relationship between stress and distortion. This relationship is characterized by a first stage including a first buckling at a lower stress and subsequent limited plastic deformation, and a second stage including resumption of elastic deformation with stress rise and a second buckling. In this way, when the length of the slide member is less than the predetermined value, buckling load increases according to relationship of the second-stage between stress and distortion.

When the shape memory alloy described above is applied to the present invention, it is possible to remarkably increase the stiffness of slide member. This is attributed to the fact that the load of slide member is adapted to resume increasing after the first buckling by adjusting the length of the slide member. For example, the adjustment is made in such a manner that the length is directly adapted to be smaller than the predetermined value or the slide member is held by restraint members so that length of a section partitioned by the restraint members is less than the predetermined value.

Because the apparatus according to the present invention enables adjustment for stiffness of a vehicle body by selecting one of permitting the slide member to move into the slit and preventing the slide member from moving into the slit, it requires smaller power compared with a conventional apparatus. This leads to downsizing of not only the apparatus itself but also a battery for supplying power for it.

Because it is possible to arbitrarily restrain the slide member so that the slide member buckles in a multiple-order deformation mode, the apparatus according to the present invention is able to more efficiently increase the stiffness of the slide member.

Because it is possible to restrain the deformation of slide member by securing the restraint member having the slit to the mutually facing portions of the deformable member, the apparatus according to the present invention provides simplified structure.

It is possible to remarkably increase the stiffness of slide member, for example in a multiple-order deformation mode, if the slide member is made of the shape memory alloy. Accordingly, it is possible to acquire differentiated buckling load according to whether or not the slide member is permitted to move into the slit. In this way, the apparatus according to the present invention is able to extensively vary the stiffness of slide member, thereby providing a wide range of adjustment for the stiffness of a vehicle body.

BRIEF DESCRIPTION OF THE DRAWINGS

FIG. 2A is an exploded perspective view showing the apparatus for controlling stiffness of a vehicle shown in FIG. 1.

FIG. 2B is an enlarged perspective view showing an actuator for an apparatus according to the present invention.

DESCRIPTION OF THE PREFERRED EMBODIMENTS

An embodiment of the present invention is now described with reference to the accompanying drawings.

Figure 1:
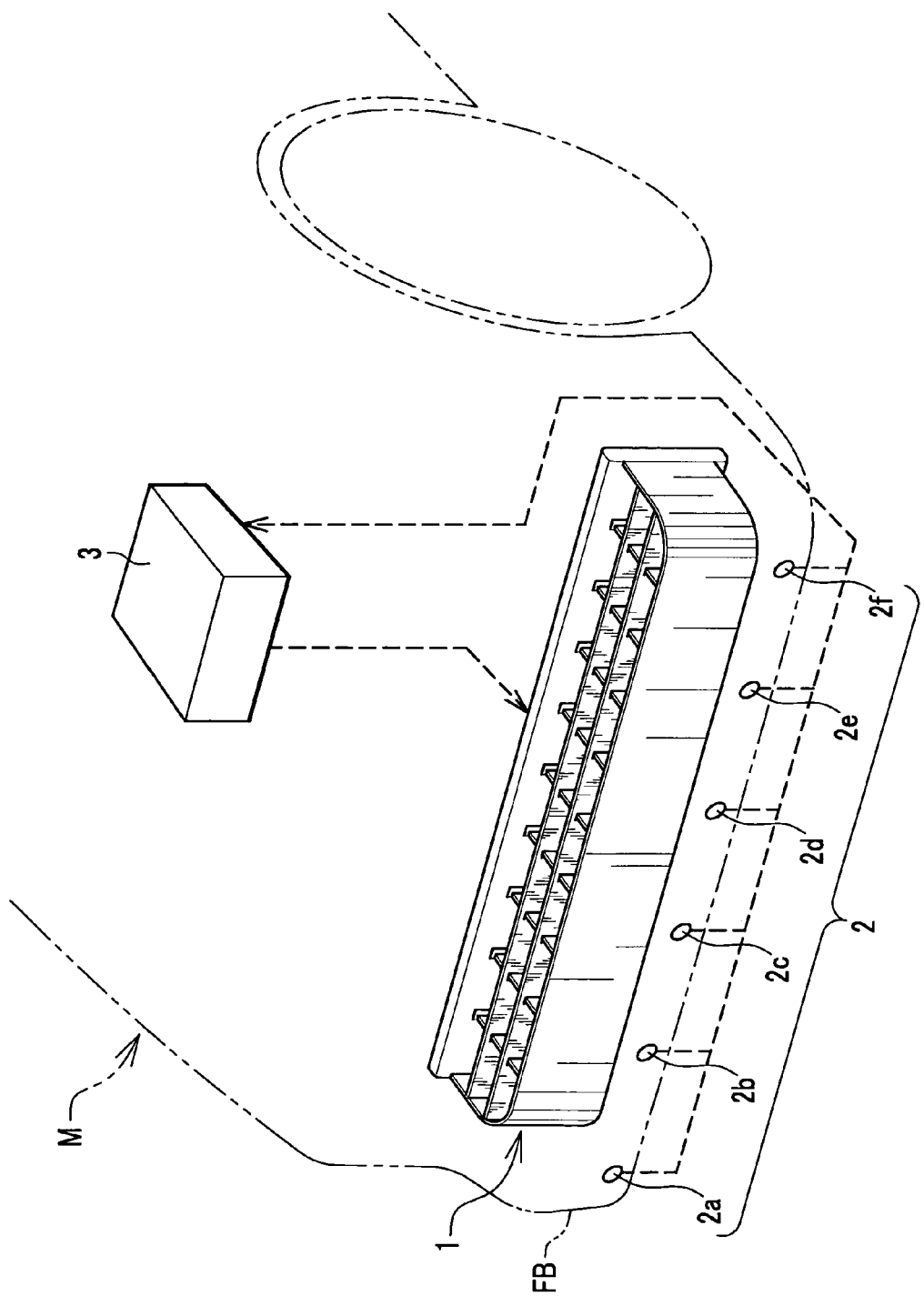
FIG. 1 is a perspective view illustrating a forward portion of a vehicle to which an apparatus for controlling stiffness of a vehicle body according to the present invention is mounted.

As shown in FIG. 1, a vehicle M is equipped with an apparatus 1 for controlling stiffness of a vehicle body, a plurality of sensors 2 for detecting colliding object and a control unit 3. The apparatus 1 and the sensors 2 are installed in a front bumper FB. The control unit 3 controls the apparatus 1 based on signals detected by the sensors 2. The sensors 2 are classified as 2a, 2b, 2c, 2d, 2e and 2f from right to left relative to the vehicle M, for convenience. In the following description, directions relative to the vehicle M are referred to in the following manner. A forward-backward direction of the vehicle M, a right-left direction of the vehicle M and a vertical direction of the vehicle M are referred to as a vehicle traveling direction, a vehicle lateral direction and a vehicle vertical direction, respectively.

As shown in FIGS. 2A and 2B, the apparatus 1 for controlling stiffness of a vehicle body mainly includes a plurality of slide members 4, a base member 5 and a deformable member 6. Each slide member 4 is disposed substantially parallel to the vehicle traveling direction (direction of impact force). The base member 5 is disposed substantially perpendicular to the vehicle traveling direction. The deformable member 6 has a cross section which is substantially U-shaped. Furthermore, the apparatus 1 includes two pieces of restraint plates (restraint members) 7 which are disposed between the base member 5 and the deformable member 6, and a plurality of actuators 8 which are attached to the base member 5.

The slide members 4, each of which is a substantially rectangular plate made of a shape memory alloy, are disposed along a longitudinal direction of the base member 5 at substantially even intervals. A forward end 41 (a first end) of a slide member 4 is connected to the deformable member 6.

The base member 5, which is a substantially rectangular plate and extends in the vehicle lateral direction, is disposed at a backward end 42 (a second end) of the slide member 4 so that both forward and backward surfaces 51 and 52 of the base member 5 are substantially perpendicular to the vehicle traveling direction. The base member 5 has a plurality of slits 53, the number of which is adapted to be equal to that of the slide members 4. Each slit 53 is so configured that a slide member 4 can move through it. An actuator 8, which selects whether or not the slide member 4 is permitted to move into the slit 53, is attached to the vicinity of the slit 53. In this connection, a part of the backward surface 52 of the base member 5 is secured to a forward portion of the vehicle M shown in FIG. 1 where the front bumper FB is secured, keeping a space into which the slide member 4 moves. Although the base member 5 described above has the forward and backward surfaces 51 and 52 which are substantially perpendicular to the vehicle traveling direction, it may be possible to select other types. For example, a base member of a curved shape which is substantially symmetrical relative to the vehicle traveling direction may be adopted in practical application, so that the base member is attached to a curved portion to which a bumper is secured. In this case, the base member is disposed so that a tangent at its front top is substantially parallel to the vehicle lateral direction.

The deformable member 6, the cross section of which is substantially U-shaped, has a left portion 61, a front portion 62 and a right portion 63. The deformable member 6 is disposed in front of forward ends 41 of the slide members 4 and the front portion 62 is secured to the slide members 4. An end portion 61a of the left portion 61 and an end portion 63a of the right portion 63 are secured to end portions 5a and 5b of the base member 5. The left portion 61 and the right portion 63 refer to "mutually facing portions of the deformable member" in the appended claim.

Two restraint plates 7 are substantially rectangular members running in the vehicle lateral direction, which are disposed at substantially even distances in the vehicle traveling direction and substantially parallel to the base member 5. Each restraint plate 7 has a plurality of slits 71 through which the slide members 4 move. The number of the slits 71 is adapted to be equal to that of the slide members 4. Each restraint plate 7, in which the slide members 4 are inserted into the slits 71, is secured to the left portion 61 and the right portion 63 of the deformable member 6.

The actuator 8 is an electromagnetic solenoid which includes a movable pin 81 and a driver 82. The driver 82 drives the movable pin 81 so that it is able to move in its axial direction. An actuator 8 is provided for each slit 53. The location of actuator 8 is determined so that it is able not only to extend the pin 81 so as to bridge the slit 53 but also to restore the pin 81 so as to clear it from the slit 53. In this way, moving the movable pin 81 in and out, the actuator 8 selects one of permitting the slide member 4 to move into the slit 53 and preventing the slide member 4 from moving thereinto at a collision.

In this connection, when the actuator 8 is off, the movable pin 81 is in a restored position, and when it is on, the movable pin 81 moves out so as to mechanically support the backward end 42 of the slide member 4. In addition, the actuator 8, which is off in normal conditions (before an outbreak of collision), is switched from off to on by the control unit 3 (see FIG. 1) at a collision. It may be alternatively possible to adopt reverse relationship between on-off of the actuator 8 and the position of the movable pin 81.

The sensors 2a14 2f shown in FIG. 1 detect hardness of a colliding object. It may be possible to use different types of devices for these sensors 2a–2f, such as a camera which detects a colliding object as an image, an infrared sensor which detects the temperature of a colliding object and a distortion sensor which detects distortion of a vehicle body at a collision. The control unit 3 determines hardness of a colliding object based on output of the sensors 2a–2f, such as image data, temperature and distortion, thereby controlling the actuator 8 (see FIG. 2) according to the hardness and vehicle velocity detected by a velocity sensor (not shown). The present invention is not limited to the sensors 2a–2f which detect hardness of a colliding object. For example, a distance sensor, which measures a distance relative to a colliding object with laser or ultrasonic wave, may be used. In this case, it is possible to select stiffness of the apparatus 1 according to types of collisions, an offset collision and a full wrap collision.

The control unit 3 determines that the size of a colliding object is greater if four or more adjacent sensors out of the sensors 2a–2f generate signals. In contrast to it, the control unit 3 determines that the size is smaller if three or less adjacent sensors generate signals. The control unit 3 controls on-off for the actuators 8 (see FIG. 2) according to the hardness and size of a colliding object. The control unit 3 selectively controls the actuators 8 which are provided for the respective slits 53, thereby adapting a deformation mode for each slide member 4.

Figure 3A:
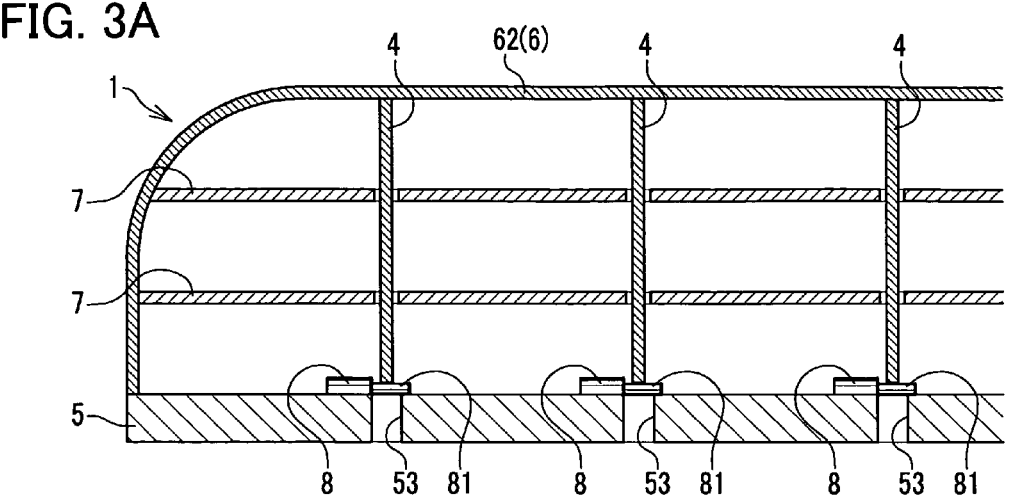
FIG. 3A is an enlarged sectional view illustrating an apparatus for controlling stiffness of a vehicle body when impact force does not act on the apparatus.
Figure 3B:
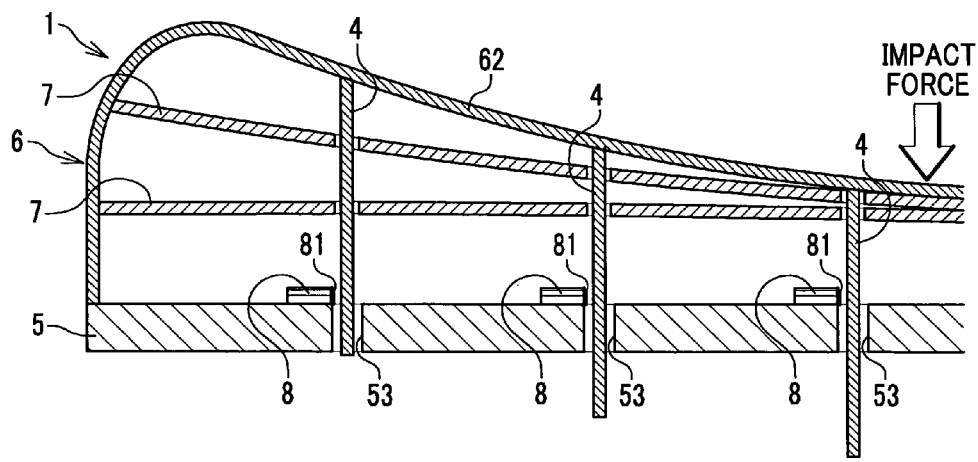
FIG. 3B is an enlarged sectional view illustrating buckling of an apparatus when an actuator is off at a collision.
Figure 3C:
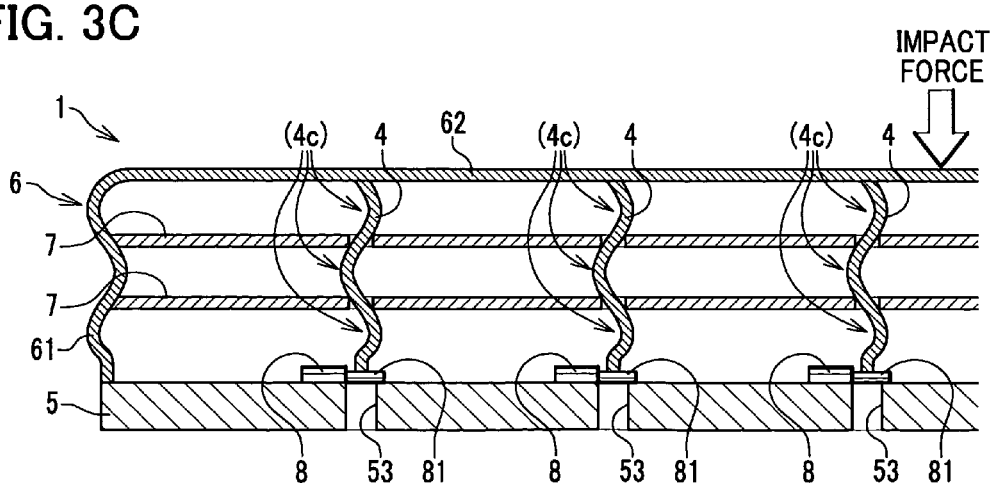
FIG. 3C is an enlarged sectional view illustrating buckling of an apparatus when an actuator is on at a collision.

Description is given of a deformation mode with reference to FIGS. 3A–3C. A slide member 4 has two deformation modes. One is non-deformation mode, as shown in FIG. 3B, in which the slide member 4 moves through the slit 53 without deformation. The other one is a third deformation mode, as shown in FIG. 3C, in which the slide member 4 deforms with three antinodes 4c. More detailed description is given for each mode below. In the non-deformation mode shown in FIG. 3B, a slide member 4 moves in a backward direction of a vehicle without deformation, because a slit 53 is open as a result of setting an actuator 8 off, which is assigned to the slide member 4. In the third deformation mode shown in FIG. 3C, a slide member 4 is prevented from moving backward at a collision, because an actuator 8 is turned on and a movable pin 81 of the actuator 8 bridges a slit 53. In addition, because deformation of the slide member 4 is restricted at two positions by the two restraint plates 7, the slide member 4 buckles in a third deformation mode.

It is possible to vary the whole stiffness of slide members 4, namely the stiffness of an apparatus 1 for controlling stiffness of a vehicle body, by selecting a deformation mode for each slide member 4, as described above. In the present embodiment, it is noted that because a slide member 4 is made of a shape memory alloy, it can provide high buckling load when it buckles in a third deformation mode. Description is given of load which resists impact force with reference to FIGS. 4A–4B, comparing the present embodiment using the shape memory alloy and another example using ordinary material such as aluminum and iron alloys.

Figure 4B:
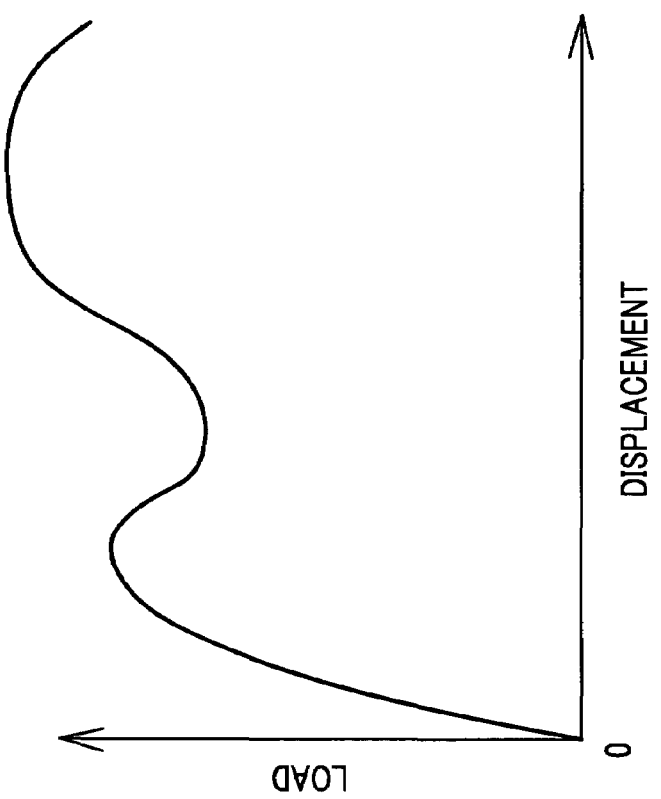
FIG. 4B is a similar graph as FIG. 4A in case of a shape memory alloy.
Figure 4A:
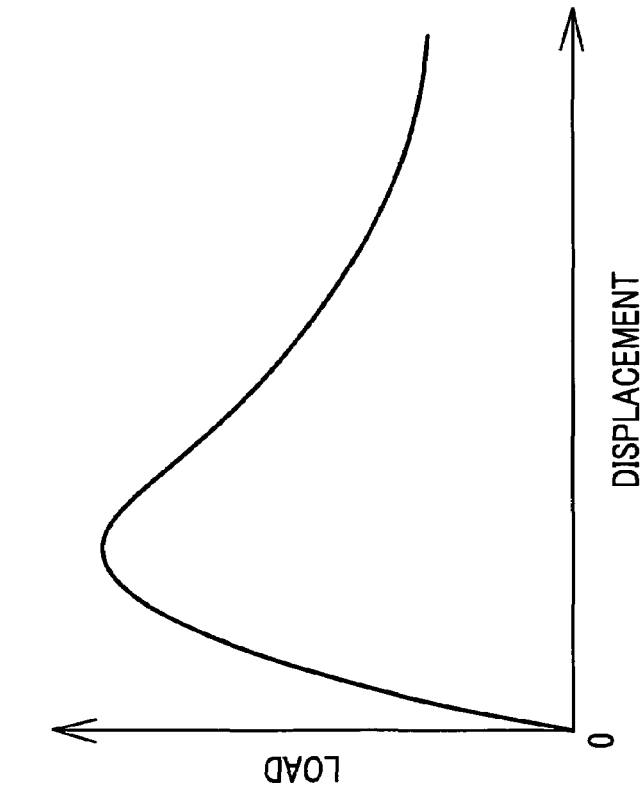
FIG. 4A is a graph showing the relationship between displacement of a slide member and resistive load against impact force in a third deformation mode in case of the slide member made of material different from a shape memory alloy.

Based on the displacement shown in FIGS. 4A and 4B, a buckling length for a third deformation mode is obtained. The buckling length is meant to represent a length from the front portion 62 of the deformable member 6 to one restraint plate 7 positioned forward, a length from this restraint plate 7 to the other restraint plate 7 positioned backward or a length from the backward restraint plate 7 to the base member 5, as shown in FIG. 3A.

As shown in FIGS. 4A and 4B, resistive load against impact force falls after buckling (a top of the curve in the graph) in case of the ordinary material. On the other hand, resistive load, which once falls after buckling, resumes rising in case of the shape memory alloy. In this way, the present embodiment, which uses the shape memory alloy, is able to increase stiffness in a third deformation mode compared with the ordinary material.

Operation of the apparatus 1 for controlling stiffness of a vehicle body is described with reference to FIGS. 1–3.

Description is first given of a case where the vehicle M collides with a relatively small object such as a telegraph pole and a compact automobile. When the vehicle M is going to collide with the relatively small object, it is detected by two adjacent sensors 2b and 2c, for example, out of the sensors 2a–2f and signals detected by the sensors 2b and 2c are sent to the control unit 3. The control unit 3 determines that the object is relatively small based on recognition that the signals originate in the two adjacent sensors 2b and 2c. When the control unit 3 determines this way, it maintains all the actuators 8 (see FIG. 2) off, taking into account vehicle velocity and the like as well. As shown in FIG. 3B, after impact force acts on the apparatus 1, all the slide members 4 move backward without deformation, so that the impact force is absorbed by the front portion 62 of the deformable member 6 and the two restraint plates 7.

Description is next given of a case where the vehicle M collides with a relatively large object such as a large-size automobile. When the vehicle M is going to collide with the relatively large object, it is detected by four adjacent sensors 2a–2d, for example, out of the sensors 2a–2f and signals detected by the sensors 2a–2d are sent to the control unit 3. The control unit 3 determines that the object is relatively large based on recognition that the signals originate in the four adjacent sensors 2a–2d. When the control unit 3 determines this way, it activates all the actuators 8 (see FIG. 2), taking into account vehicle velocity and the like as well. As shown in FIG. 3C, after impact force acts on the apparatus 1, all the slide members 4 buckle in a third deformation mode.

The present invention is not limited to the above description in which the control unit 3 simultaneously sets all the actuators 8 on or off so that the slide members 4 are uniformly in a third deformation mode or a non-deformation mode. It may be possible to selectively determine an appropriate mode for each slide member 4 according to colliding objects. An exemplary arrangement may be that an appropriate mode is set for only some slide members 4 located in the right half which receive impact force.

As shown in FIG. 3C, when the actuators 8 are turned on, the left portion 61 of the deformable member 6 buckles in a third deformation mode in the same manner as that of a slide member 4. This is true of the right portion 63, which is shown in FIG. 2. In this way, the stiffness of deformable member 6 is controlled in a similar manner as that of the slide member 4.

Although the actuators 8 are controlled according to the size of a colliding object as described above, the present invention is not limited to this. For example, it is possible to control the actuators 8 according to the hardness of a colliding object. In this connection, when the control unit 3 determines that the hardness of colliding object is less than a predetermined value, it turns off all the actuators 8 so as to allow all the slide members 4 to freely move backward without deformation. When the control unit 3 determines otherwise, it turns on all the actuators 8 so as to block all the slide members 4 so that they buckle in a third deformation mode.

The present invention brings advantages described below.

Because the stiffness of a vehicle body is controlled by setting an actuator 8 to one of permitting a slide member 4 to move into a slit 53 and preventing the slide member 4 from moving thereinto, an apparatus 1 for controlling stiffness of a vehicle does not require so much power as a conventional one. This leads to downsizing of not only the apparatus itself but also a battery for supplying power for it.

Because it is possible to make a slide member 4 buckle in a third deformation mode by holding its two positions with two restraint plates 7, the stiffness of the slide member 4 will increase. Furthermore, because the slide member 4 is made of the shape memory alloy, it is possible to remarkably increase the stiffness of the slide member 4 while it is deformed in a third deformation mode with the two restraint plates 7. As a result, it is possible to vary the buckling load of the slide member 4 in a wide range, which leads to a wide variation of stiffness for a vehicle body.

Because the deformable member 6 buckles in a third deformation mode in the same manner as that of the slide member 4, total stiffness of the apparatus 1 for controlling stiffness of a vehicle in a third deformation mode can be remarkably increased. Furthermore, because the slide member 4 is only restricted by the slit 71 of the restraint plate 7, it is possible to simplify the structure of the apparatus 1.

It will now be appreciated from the foregoing description that the present invention is not limited to the particularly illustrated embodiment discussed above and may be carried out in various modified forms.

The present invention is not limited to the embodiment described above, in which the slide member 4 is disposed parallel relative to the vehicle traveling direction. It may be alternatively possible that the apparatus 1 is arbitrarily disposed as long as the slide member 4 is substantially parallel to impact force. For example, an apparatus 1 for controlling stiffness of a vehicle body may be disposed on each of right and left sides of a vehicle so that a slide member 4 is substantially parallel to the vehicle lateral direction, making provision for a side collision.

The present invention is not limited to the embodiment which employs the shape memory alloy only for the slide member 4. It may be alternatively possible to use a shape memory alloy for the deformable member 6 in addition to the slide member 4, or for all other members. In this regard, when the shape memory alloy is applied to the deformable member 6, its stiffness remarkably increases as a result of buckling of the right and left portions 63 and 61 in a third deformation mode.

Figure 6:
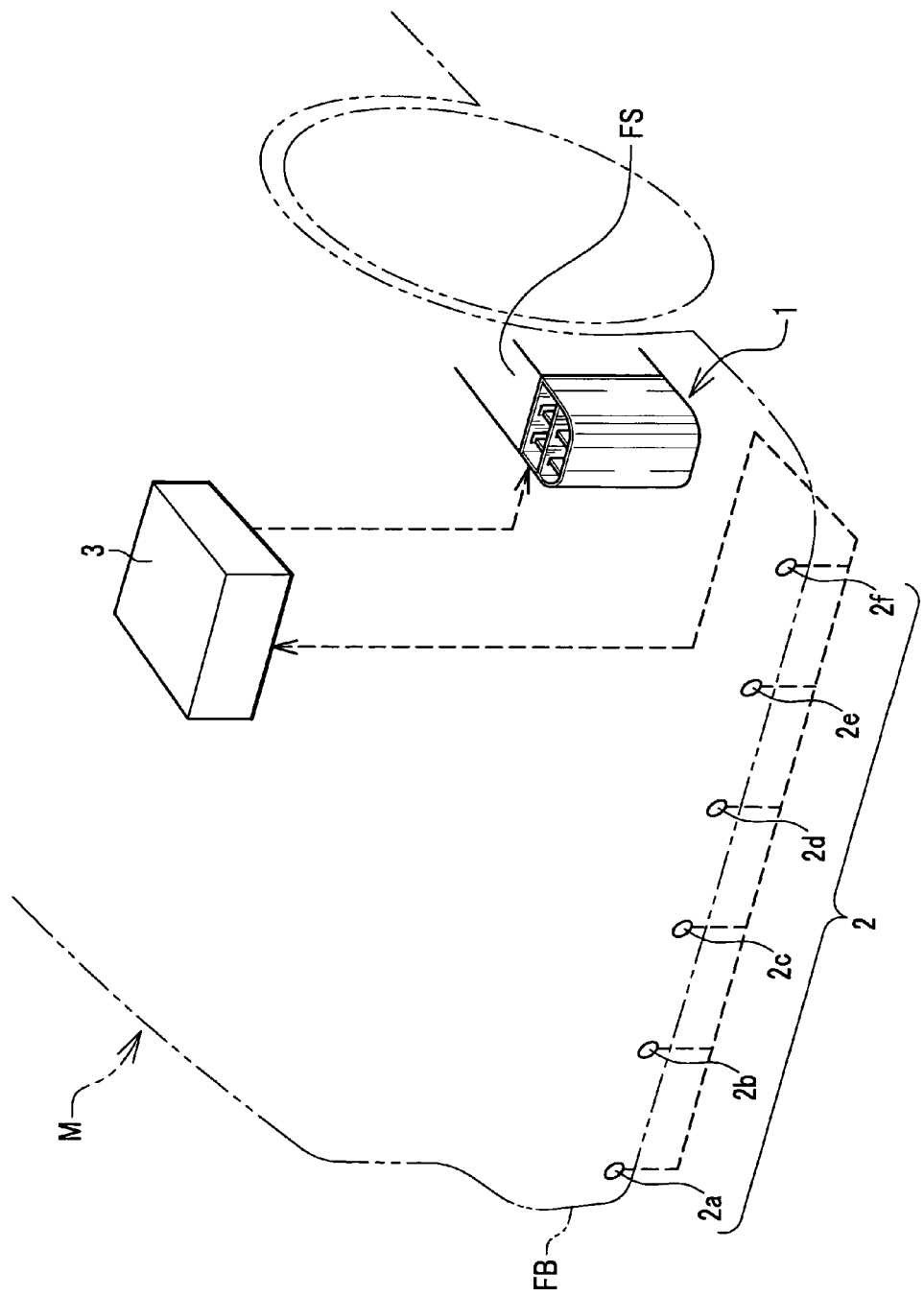
FIG. 6 illustrates an apparatus according to the present invention, which is partially applied to a portion of vehicle.

The present invention is not limited to the embodiment described above, in which the apparatus 1 is sized substantially the same as the front bumper FB. For example, it may be alternatively possible to provide a partial apparatus 1 for a portion of a vehicle which requires control of stiffness, such as the right or left portion of the front bumper FB and the forward end of a side frame FS as shown in FIG. 6. Though the actuator 8 is controlled according to the size of colliding object in the embodiment, it may be alternatively possible to control the actuator 8 according to types of collisions such as an offset collision and a full wrap collision.

Figure 5A:
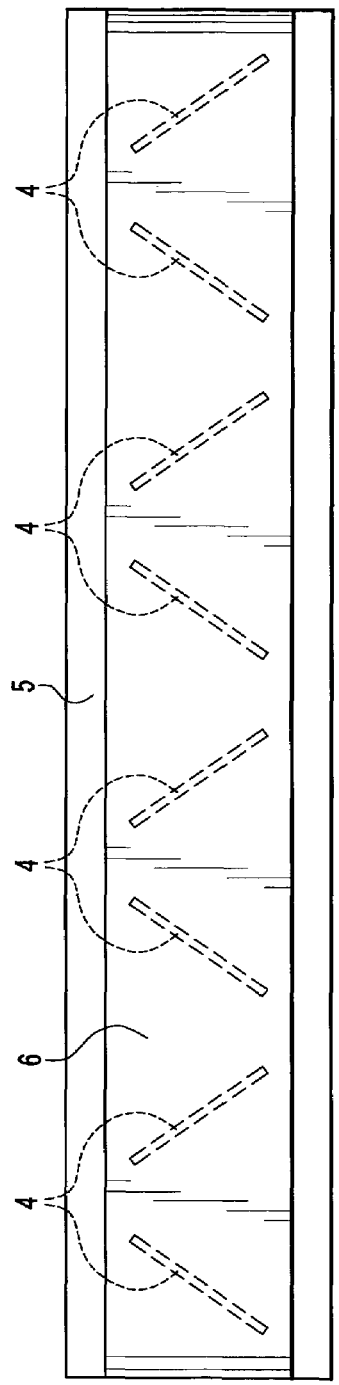
FIG. 5A is a front view illustrating an example of apparatus according to the present invention, which uses diagonally disposed slide members.
Figure 5B:
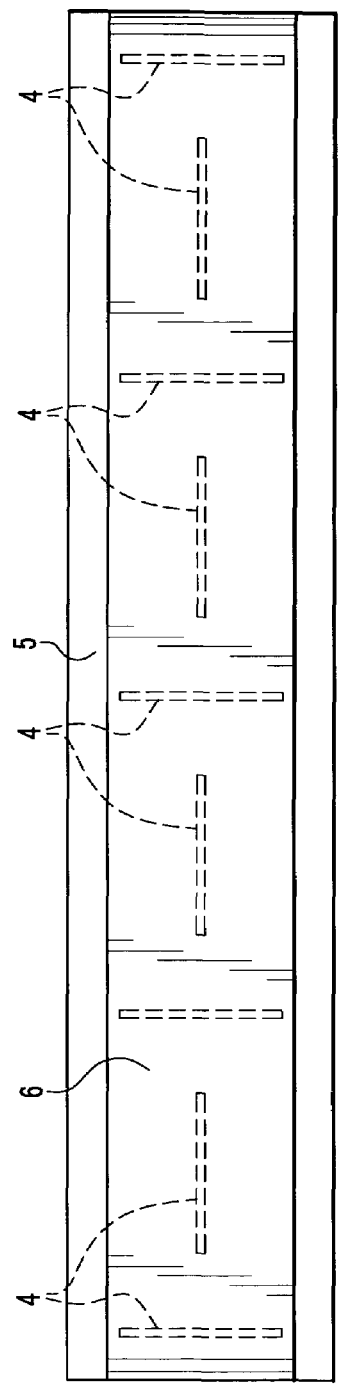
FIG. 5B is a front view illustrating an example of apparatus according to the present invention, which uses vertically and horizontally disposed slide members.

The present invention is not limited to the embodiment, in which the slide members 4 are vertically disposed as viewed from the front of a vehicle, in other words perpendicular to the vehicle lateral direction. It may be possible to arbitrarily dispose the slide members 4 as long as they are substantially parallel to a collision direction. For example, it may be possible to diagonally dispose the slide members 4 as viewed from the front of a vehicle, as shown in FIG. 5A. Furthermore, it may be possible to alternately dispose the slide members 4 in vertical and horizontal directions as shown in FIG. 5B. In this connection, it is necessary to adjust the slits 71 of restraint plate 7 and the slits 53 of base member 5 to meet directions of the slide members 4.

The present invention is not limited to the embodiment, in which the two restraint plates 7 are provided so that the slide members 4 buckle in a third deformation mode. It may be alternatively possible to buckle the slide members 4 in a first deformation mode by eliminating the restraint panels 7. It may also be alternatively possible to employ one, three, four or more restraint panels 7 so that the slide members 4 buckle in a second, fourth, fifth or higher deformation mode, respectively.

The present invention is not limited to the embodiment, in which the slide member 4 is like a plate. It may be alternatively possible to adopt a rod-like member or a linear member.

The present invention is not limited to the embodiment, either, in which a plate member, namely the restraint plate 7 is used. For example, it is possible to select a slide member 4 which has a slit running in the vehicle traveling direction. A rod which allows the slide member 4 to move along the slit is held at the right and left portions 63 and 61 of the deformable member 6. A flange is provided, which restricts movement of the slide member 4 in the vehicle lateral direction but allows it to freely move in the vehicle traveling direction. In this way, another method for restriction in lieu of the restraint plate 7 can be introduced.

Foreign priority document, JP 2003-362912, filed on Oct. 23, 2003, is hereby incorporated by reference.

What is claimed is:

1. An apparatus for controlling stiffness of a vehicle body comprising:
   a slide member which is disposed parallel to a direction of impact force acting on a first end of the slide member;
   a base member which is disposed at a second end of the slide member, the base member having a slit into which the slide member moves;

a deformable member which is disposed at the first end of the slide member, both ends of the deformable member being connected to the base member, a cross section of the deformable member being substantially U-shaped; and an actuator which executes one of permitting the slide member to move into the slit and inhibiting the slide member from moving into the slit at a collision.

2. An apparatus according to claim 1 further comprising a restraint member which restrains deformation of the slide member in a direction substantially perpendicular to the impact force.

3. An apparatus according to claim 2, wherein both ends of the restraint member are connected to mutually facing portions of the deformable member and the restraint member has a slit through which the slide member moves.

4. An apparatus according to claim 1, wherein the slide member comprises a shape memory alloy.

* * * * *